(12) United States Patent
Tu et al.

(10) Patent No.: US 10,432,243 B2
(45) Date of Patent: *Oct. 1, 2019

(54) RECEIVER NONLINEARITY ESTIMATION AND CANCELLATION

(71) Applicant: MaxLinear, Inc., Carlsbad, CA (US)

(72) Inventors: Wen-Chi Tu, Carlsbad, CA (US); Stephane Laurent-Michel, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,789

(22) Filed: Dec. 21, 2018

(65) Prior Publication Data
US 2019/0123772 A1    Apr. 25, 2019

Related U.S. Application Data

(63) Continuation of application No. 15/180,754, filed on Jun. 13, 2016, now Pat. No. 10,164,674.

(60) Provisional application No. 62/174,932, filed on Jun. 12, 2015.

(51) Int. Cl.
*H04B 1/12* (2006.01)
*H04B 1/04* (2006.01)

(52) U.S. Cl.
CPC ............ *H04B 1/123* (2013.01); *H04B 1/0475* (2013.01)

(58) Field of Classification Search
CPC ............ H03H 21/0012; H03H 21/0021; H04L 27/2647; G01S 7/023; H04J 11/0066; H04B 1/123; H04B 1/0475
See application file for complete search history.

(56) References Cited

U.S. PATENT DOCUMENTS

| 5,063,572 A | 11/1991 | Leahy et al. |
| 7,518,459 B2 | 4/2009 | Cheng et al. |
| 7,738,851 B2 | 6/2010 | Cooley et al. |
| 8,285,240 B2 | 10/2012 | Seendripu et al. |
| 9,705,477 B2 * | 7/2017 | Velazquez .......... H03H 21/0067 |

(Continued)

*Primary Examiner* — Khanh C Tran
(74) *Attorney, Agent, or Firm* — McAndrews, Held & Malloy, Ltd.

(57) ABSTRACT

Systems and methods are provided for receiver nonlinearity estimation and cancellation. Narrowband (NB) estimation may be performed in a receiver during handling of received radio frequency (RF) signals. The narrowband (NB) may include generating estimation channelization information relating to received RF signals; generating reference nonlinearity information relating to one or more other signals, which may cause or contribute to nonlinearity that affects the processing of the received RF signals; and generating, based on the estimation channelization information relating to the received RF signals and the reference nonlinearity information relating to the other signals, control data for configuring nonlinearity cancellation functions. The received RF signals may be channelized, and the estimation channelization information may be generated based on the channelization of the received RF signals. The other signals may be channelized, and the reference nonlinearity information may be generated based on the channelization of the other signals.

20 Claims, 9 Drawing Sheets

(56) References Cited

U.S. PATENT DOCUMENTS

| | | | |
|---|---|---|---|
| 2005/0190867 A1* | 9/2005 | Sobchak | H04B 1/1036 375/346 |
| 2010/0048146 A1 | 2/2010 | McCallister | |
| 2011/0260898 A1* | 10/2011 | Velazquez | H03F 1/3247 341/110 |
| 2012/0013494 A1* | 1/2012 | Song | H03M 1/12 341/122 |
| 2016/0191020 A1* | 6/2016 | Velazquez | H03H 21/0067 341/118 |
| 2017/0026205 A1 | 1/2017 | Agee | |

* cited by examiner

RECEIVER NONLINEARITY ESTIMATION AND CANCELLATION

CLAIM OF PRIORITY

This patent application is a continuation of U.S. Provisional patent application Ser. No. 15/180,754, filed on Jun. 13, 2016, which makes reference to, claims priority to and claims benefit from U.S. Provisional Patent Application Ser. No. 62/174,932, filed on Jun. 12, 2015. Each of the above identified applications is hereby incorporated herein by reference in its entirety.

TECHNICAL FIELD

Aspects of the present disclosure relate to signal processing. More specifically, various implementations of the present disclosure relate to receiver nonlinearity estimation and cancellation.

BACKGROUND

Conventional approaches for handling nonlinearity, particularly at the receiver-side during communications, may be costly, cumbersome, or inefficient—e.g., they may be complex and/or time consuming, require considerable power, and/or may introduce errors or distortion. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for receiver nonlinearity estimation and cancellation, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Figure 1:
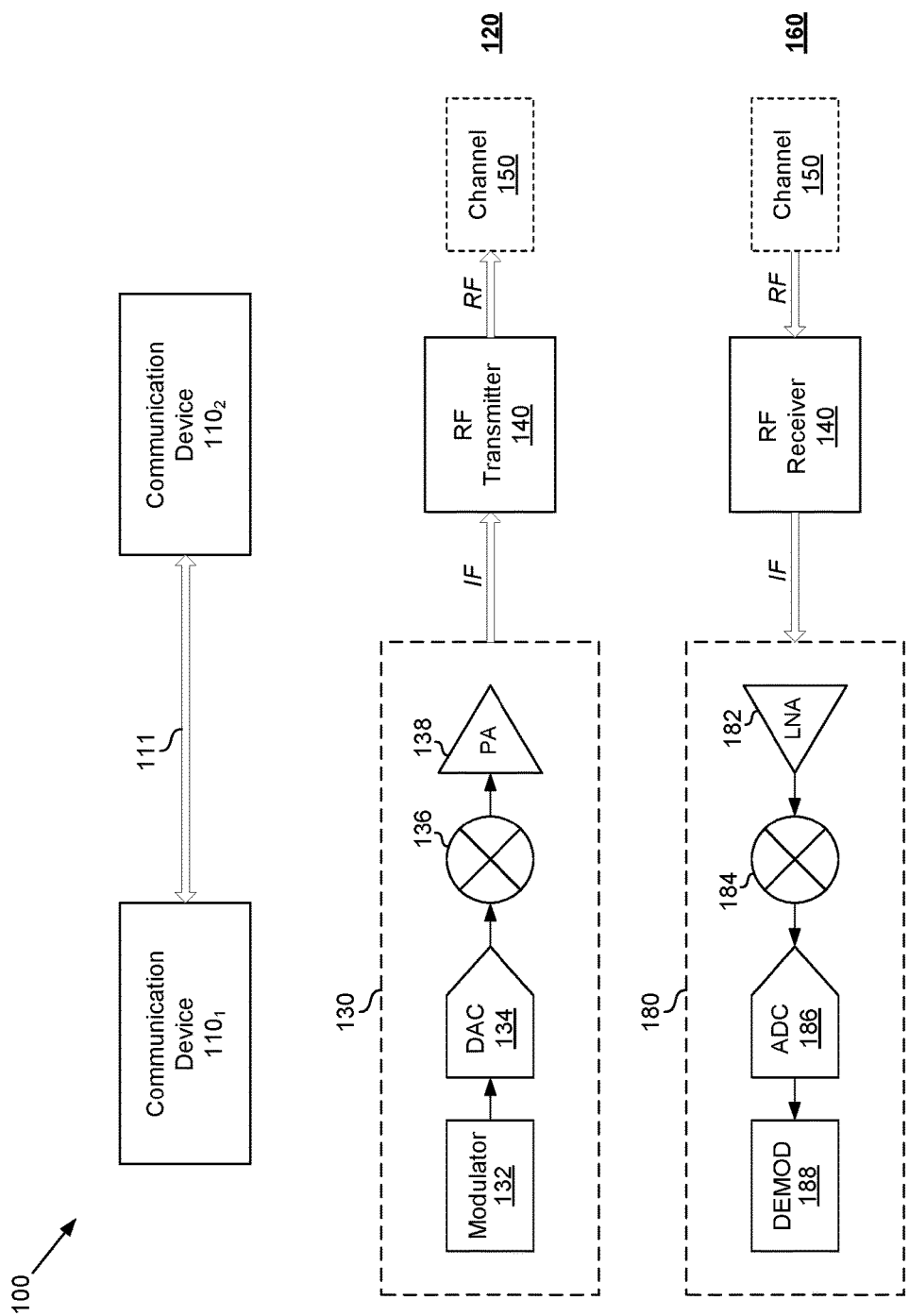
FIG. 1 illustrates an example communication arrangement in which nonlinearity may occur at the receiver-side.

FIG. 1 illustrates an example communication arrangement in which nonlinearity may occur at the receiver-side. Shown in FIG. 1 is a communication arrangement 100, comprising communication devices 110$_1$ and 110$_2$, which may communicate via a connection/link 111.

Each of the communication devices 110$_1$ and 110$_2$ may comprise suitable circuitry for communication over wired and/or wireless connections. In this regard, the communication devices 100 may support a plurality of wired and/or wireless interfaces and/or protocols, and may be operable to perform necessary processing operations to facilitate transmission and/or reception of signals (e.g., RF signals) over supported wired and/or wireless interfaces.

Examples of communication devices may include cellular and smart phones or similar handheld devices, tablets, personal computers, laptops or notebook computers, servers, personal media players, personal digital assistants, set top boxes, satellite receivers, wireless access points, cellular base stations, etc. The disclosure is not limited, however, to particular type of communication devices, and may apply to any electronic platform that may be operable to communicate (transmit and/or receive) signals.

Examples of wireless standards, protocols, and/or interfaces which may be supported and/or used by the communication devices $110_1$ and $110_2$ for communication therebetween may comprise wireless personal area network (WPAN) protocols (e.g., as Bluetooth (IEEE 802.15) and ZigBee), near field communication (NFC) standards, wireless local area network (WLAN) protocols (e.g., such as WiFi (IEEE 802.11) standards), cellular standards (including 2G/2G+, such as GSM/GPRS/EDGE, IS-95 or cdmaOne, etc., and 3G/3G+, such as CDMA2000, UMTS, and HSPA, etc.), 4G standards (e.g., WiMAX (IEEE 802.16) and LTE), Ultra-Wideband (UWB), Extremely High Frequency (EHF, such as 60 GHz) Digital TV Standards (e.g., DVB-T/DVB-H, and ISDB-T), etc.

Examples of wireless standards, protocols, and/or interfaces which may be supported and/or used by the communication devices $110_1$ and $110_2$ for communication therebetween may comprise Ethernet (IEEE 802.3), Digital Subscriber Line (DSL), Integrated Services Digital Network (ISDN), Fiber Distributed Data Interface (FDDI), cable television and/or internet access standards (e.g., ATSC, DVB-C, DOCSIS, etc.), in-home distribution standards such as Multimedia over Coax Alliance (MoCA), Universal Serial Bus (USB) based standards/protocols/interfaces, etc.

In operation, the communication devices $110_1$ and $110_2$ may communicate over the connection/link 111. The connection/link 111 may be unidirectional (e.g., allow for communications in only one direction, such as from the communication device $110_1$ to the communication device $110_2$), or may be bidirectional (e.g., allowing for communications in both directions—that is from the communication device $110_1$ to the communication device $110_2$, and from the communication device $110_2$ to the communication device $110_1$) In this regard, the connection/link 111 may be configured to allow for concurrent bidirectional communications between the two devices (e.g., using time division duplex (TDD) and/or frequency division duplex (FDD) simultaneous transmit and receive (STR)).

Communications over the connection/link 111 may comprise transmission and reception of signals (e.g., RF signals), which may be utilized to carry data communicated between the communication devices $110_1$ and $110_2$. The signals communicated over the connection/link 111 may be setup, configured, and/or utilized in accordance with corresponding wired and/or wireless interfaces, protocols, and/or standards. The communication devices $110_1$ and $110_2$ may comprise suitable components configured to perform various functions or operations to facilitate the transmission and reception of signals, particularly RF signals. A simplified RF transmission and reception model is illustrated in FIG. 1.

At the transmitter-side 120, a transmission (Tx) processing path 130 may be used to generate intermediate frequency (IF) signals. The Tx processing path 130 may comprise suitable circuitry for generating the IF signals, such as based on digital input (data) that is intended to be carried and/or embedded in the communicated signals. The Tx processing path 130 may comprise, for example, a modulation circuit 132, a digital-to-analog converter (DAC) circuit 134, a mixer circuit 136, and a power amplifier circuit 138. The IF signals may then be sent to a RF transmitter 140, which may comprise suitable circuitry for generating and transmitting radio frequency (RF) signals, such as based on IF signals provided thereto. The RF signals are then communicated over a RF channel 150.

At the receiver-side 160, the RF signals may be received from the channel 150 via a RF receiver 170, which may comprise suitable circuitry for receiving radio frequency (RF) signals, and processing them to generate corresponding intermediate frequency (IF) signals. The IF signals are then sent to a reception (Rx) processing path 180, which may comprise suitable circuitry for processing IF signals, such as to extract data carried and/or embedded therein (e.g., the digital data embedded into the RF signals at the transmitter-side). The Rx processing path 180 may comprise, for example, low-noise amplifier (LNA) circuit 182, a mixer circuit 184, digital-to-analog converter (DAC) circuit 186, and a demodulator circuit 132.

In some instances, performance (e.g., overall communication and/or particular communication related operations and functions, and/or components used therefor) may need to be optimized, such as to meet certain performance parameters, criteria, and/or conditions, and/or to account for possible conditions that may degrade performance. For example, reception operations (and/or components used therefor, such as the receiver 170 and/or Rx processing path 180) may be need to be configured to support wide carrier frequency range (e.g., 5-43.5 GHz) and a wide bandwidth (e.g., 1.75-224 MHz) while still ensuring optimal performance (e.g., high modulation error ratio (MER) at the IF output). Such performance criteria may necessitate, among other things, high linearity requirements. However, the performance of the receiver may be degraded in some situations, such as in a manner that may affect the linearity characteristics of the receiver. For example, in some instances certain unwanted signals (e.g., blockers) may limit the performance of the receiver, causing nonlinearities under some conditions, as explained in more detail below.

Accordingly, in various implementations in accordance with the present disclosure, communication systems (or components thereof) may be implemented to ensure optimal linearity while still meeting other performance requirement. This may be achieved, for example, by incorporating support for adaptive nonlinearity detection and estimation, and for nonlinearity cancellation based thereon, at the receiver-side. Examples of such implementations are described in more detail below.

While the receiver-side architecture shown in FIG. 1 and referenced hereafter (e.g., with respect to various implementations in accordance with the present disclosure) may be a (low) IF based architecture, the disclosure is not so limited. Thus, in some instances a zero-IF received architecture may implement and/or utilize various aspects of the present disclosure (e.g., implementations, techniques, etc.).

Figure 2:
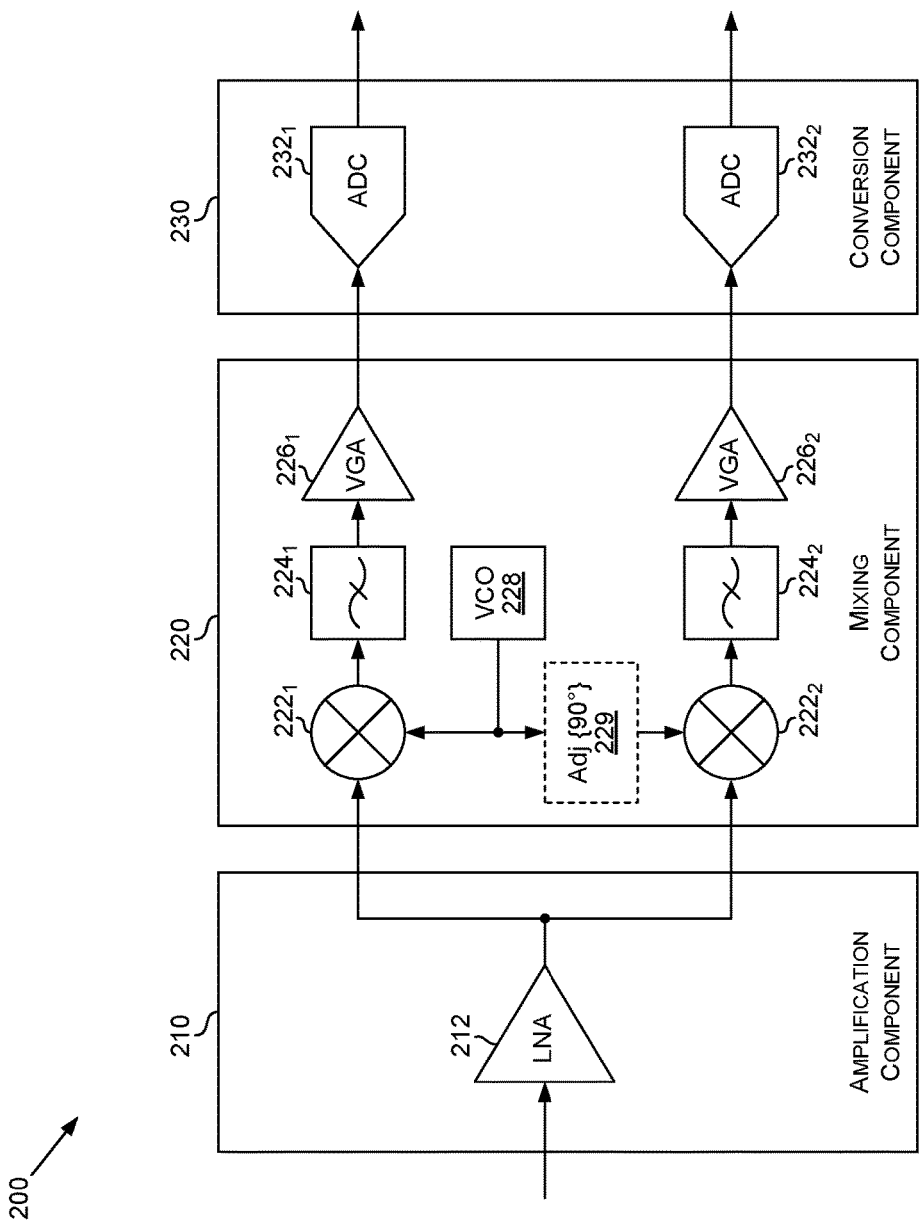
FIG. 2 illustrates an example analog front-end (AFE) in which nonlinearity may occur during reception operations.

FIG. 2 illustrates an example analog front-end (AFE) in which nonlinearity may occur during reception operations. Shown in FIG. 2 is analog front-end AFE block 200, which may be used during reception operations.

The AFE block 200 may comprise suitable circuitry for use in receiving and processing signals. The AFE block 200 may comprise an amplification component 210, a mixing component 220, and a conversion component 230. The amplification component 210 may comprise suitable circuitry for performing initial amplification on an input (e.g., received RF signal). The amplification component 210 may comprise, for example, a low-noise amplifier (LNA) circuit 212.

The mixing component 220 may comprise suitable circuitry for mixing (and performing related functions and/or operations) to the input (RF signal) after the initial amplification. The mixing component 220 may be operable to, for example, generate the in-phase and quadrature components (I/O components) of the input signals. For example, the mixing component 220 may comprise a pair of mixer circuits 222$_1$ and 222$_2$, a pair of filter circuits 224$_1$ and 224$_2$, and a pair of variable-gain amplifier (VGA) circuits 226$_1$ and 226$_2$. Further, the mixing component 220 may comprise a voltage-controlled oscillator (VCO) circuit 228, which provides a reference mixing signal, and an adjuster circuit 229, which may be operable to apply an adjustment (e.g., 90° shift) to the output of the VCO circuit 228 (before being applied to one of the mixer circuits 222$_1$ and 222$_2$), to facilitate the generation of the I/O components. In some instances, the filter circuits 224$_1$ and 224$_2$ may be anti-aliasing filter (AAF) circuits, and as such the filtering performed in the mixing component 220 may be anti-aliasing filtering.

The conversion component 230 may comprise suitable circuitry for applying necessary conversions to the outputs of the mixing component 220. For example, the conversion component 230 may comprise one or more analog-to-digital converter (ADC) circuits—e.g., ADC circuits 232$_1$ and 232$_2$ in the implementation shown in FIG. 2, each being used to apply analog-to-digital conversion to each of the I/O components generated in the mixing component 220.

As shown in FIG. 2, the AFE block 200 may exhibit nonlinearity behavior, which may be result in the system failing to meet linearity requirements needed to meet overall performance criteria. The nonlinearity behavior of the AFE block 200 may be due to third-order intercept point (IP3) and/or second-order intercept point (IP2) characteristics of each of the various components of the system, which may result in intermodulation (IM) and/or harmonic distortion (HD) related nonlinearities at the outputs. Examples IM/HD scenarios are described in more detail with respect to FIGS. 3A and 3B. Nonetheless, while many of the implementations described are directed to second-order and/or third order nonlinearities (or effects thereof), the disclosure is not so limited. In this regard, a similar approach as described in the present disclosure may apply in substantially similar manner to other (e.g., higher) order nonlinearities, such as (e.g., fourth-order intercept point (IP4), fifth-order intercept point (IP5), etc.).

Figure 3A:
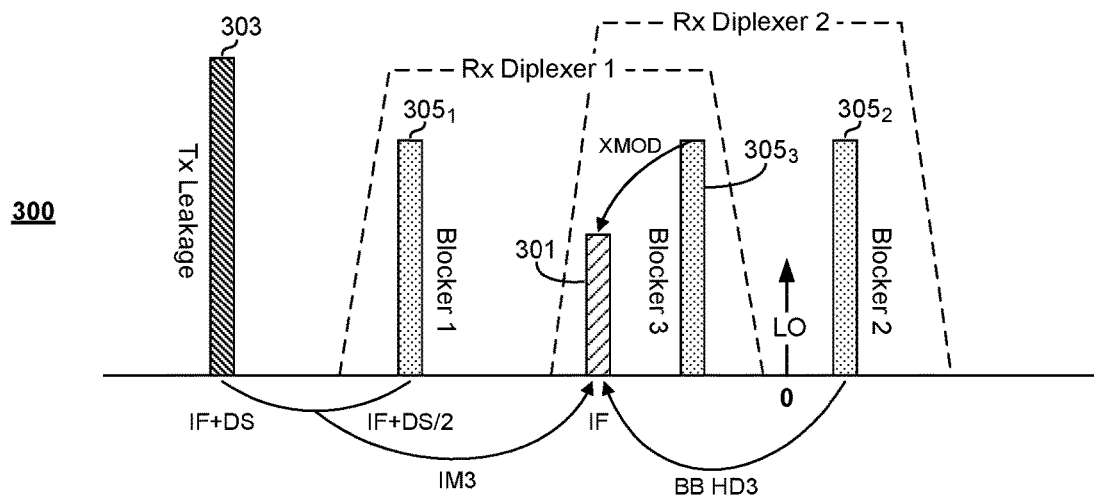
FIGS. 3A and 3B illustrate example impacts of inter-modulation (IM) and harmonic distortion (HD) during reception operations.
Figure 3B:
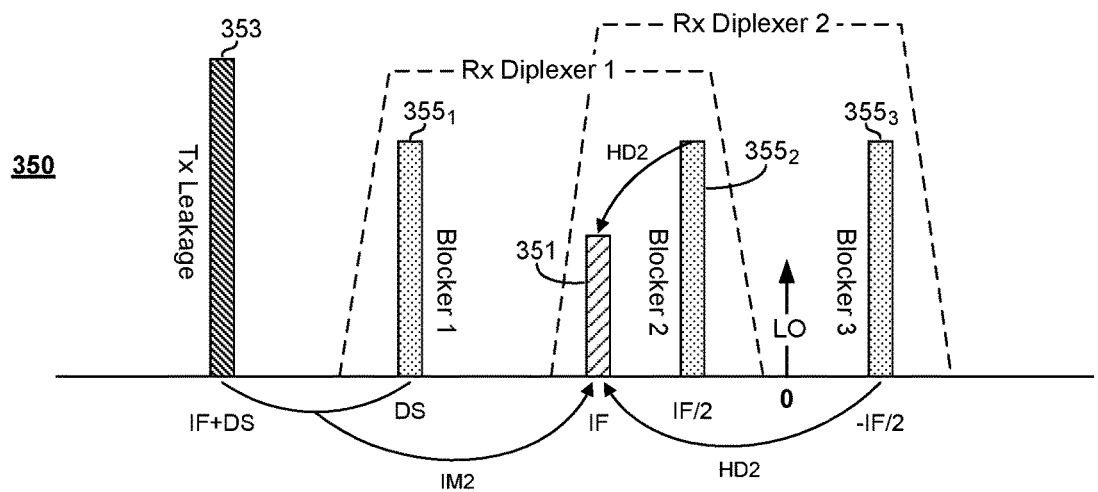

FIGS. 3A and 3B illustrate example impacts of intermodulation (IM) and harmonic distortion (HD) during reception operations. Shown in FIGS. 3A and 3B are frequency charts 300 and 350, respectively.

The frequency chart 300 illustrates an example scenario where 3rd order products (e.g., 3rd order intermodulation (IM3), crossmodulation (XMOD), and baseband (BB) 3rd order harmonic distortion (HD3)) may affect a desired signal 301 in the processing path, such as during the mixing and/or conversion stages—e.g., in the mixing component 220 and/or conversion component 230. The desired signal 301 may be at frequency location IF (intermediate frequency), such as after shifting during initial processing in the RF receiver. The 3rd order products may then affect the desired signal 301 (that is, fall at frequency location IF) when the causing signals (e.g., transmit (Tx) leakage 303, blockers 305$_i$, etc.) may be at particular frequency locations. For example, IM3 may occur as a result of the combined effect of the Tx leakage 303 that is at frequency location IF+DS, and a blocker 305$_1$, within the first receiver (Rx) diplexer, at frequency location IF+DS/2. In this regard, DS is the Duplex Spacing frequency, which is defined in a FDD system as the fixed frequency separation at RF between the TX signal and the RX signal. The Tx leakage 303 may result in such systems from the Tx (signal) leaking thru the diplexer on to the receiver path. The BB HD3 may occur as a result of a second blocker 305$_2$ in a second receiver (Rx) diplexer, whereas the XMOD may occur as a result of another blocker 305$_3$.

The frequency chart 350 illustrates an example scenario where 2nd order products (e.g., 2nd order intermodulation (IM2) and 2nd order harmonic distortion (HD2)) may occur while a receiver attempts to capture a desired signal 351 in the processing path, such as during the mixing and/or conversion stages—e.g., in the mixing component 220 and/or conversion component 230. The desired signal 351 may again be at frequency location IF. The 2nd order products may then affect the desired signal 351 (that is, fall at frequency location IF) when the causing signals (e.g., transmit (Tx) leakage 353, blockers 355$_i$, etc.) may be at particular frequency locations. For example, IM2 may occur as a result of the combined effect of the Tx leakage 353 that is at frequency location IF+DS, and a blocker 355$_1$, within the first receiver (Rx) diplexer, at frequency location DS. The HD2 may occur as a result of a blocker 355$_2$, within the second receiver (Rx) diplexer, at frequency location IF/2, and/or a result of a blocker 355$_3$ within the second receiver (Rx) diplexer, at frequency location −IF/2.

As noted above, the 2nd order and/or 3rd order products may result in nonlinearity behavior in the communication system during reception operations. Accordingly, in various implementations in accordance with the present disclosure, communication systems (or components thereof) may be implemented and/or configured to remedy undesirable nonlinearities, particularly during reception operations. For example, communication systems may incorporate components that are designed and/or configured to support performing adaptive nonlinearity detection and estimation, and applying nonlinearity cancellation based thereon. The nonlinearity detection may comprise assessing the presence of nonlinearity. This may comprise, for example, determining if there are distorting signals (e.g., blockers, Tx leakage, etc.) which may cause nonlinearity related distortion, and if so, determine if the distorting signals (individually or in combination) may actually cause nonlinearity—e.g., whether these distorting signals may hit pre-determined IP2/IP3 locations, thus resulting in 2nd order and/or 3rd order distortion (e.g., IM2, IM3, HD2, HD3, XMOD, etc.). Once nonlinearity is detected, remedial measures may be taken to cancel the nonlinearities or effects thereof. This may entail estimating the nonlinearity (effects), such that the proper corrections may be determined (or estimated). The nonlinearity estimation and/or correction thereof may be configured based on the required SNR (signal-to-noise ratio) rather than nonlinearity parameters (e.g., IP2/IP3 numbers).

In an example implementation, to optimize performance estimation of nonlinearity (or necessary correction thereof) may be performed as narrowband (NB) estimation—that is, based on narrowband signals (or channels); whereas the correction may be performed as wideband (WB) correction—that is, the nonlinearity (NL) cancellation is applied to wideband signals. Use of such combination of narrowband (NB) estimation and wideband (WB) correction may be optimal because the NB estimation may be more power efficient (than WB estimation) and WB correction (NL cancellation) may be more robust (e.g., against TDD blockers and sweeping blockers).

In an example implementation, the nonlinearity estimation (and the determination of required nonlinearity corrections based thereon) may comprise analyzing the whole spectrum, such as to obtain information useful for nonlinearity estimation and/or correction (e.g., to determine presence and location of desired signals and/or particular blockers). Further, other means beyond what is specifically described herein may be used in detecting and/or estimating (and thus determining needed corrections) nonlinearity, such as, for example, AM-AM and AM-PM look up table models.

Figure 4:
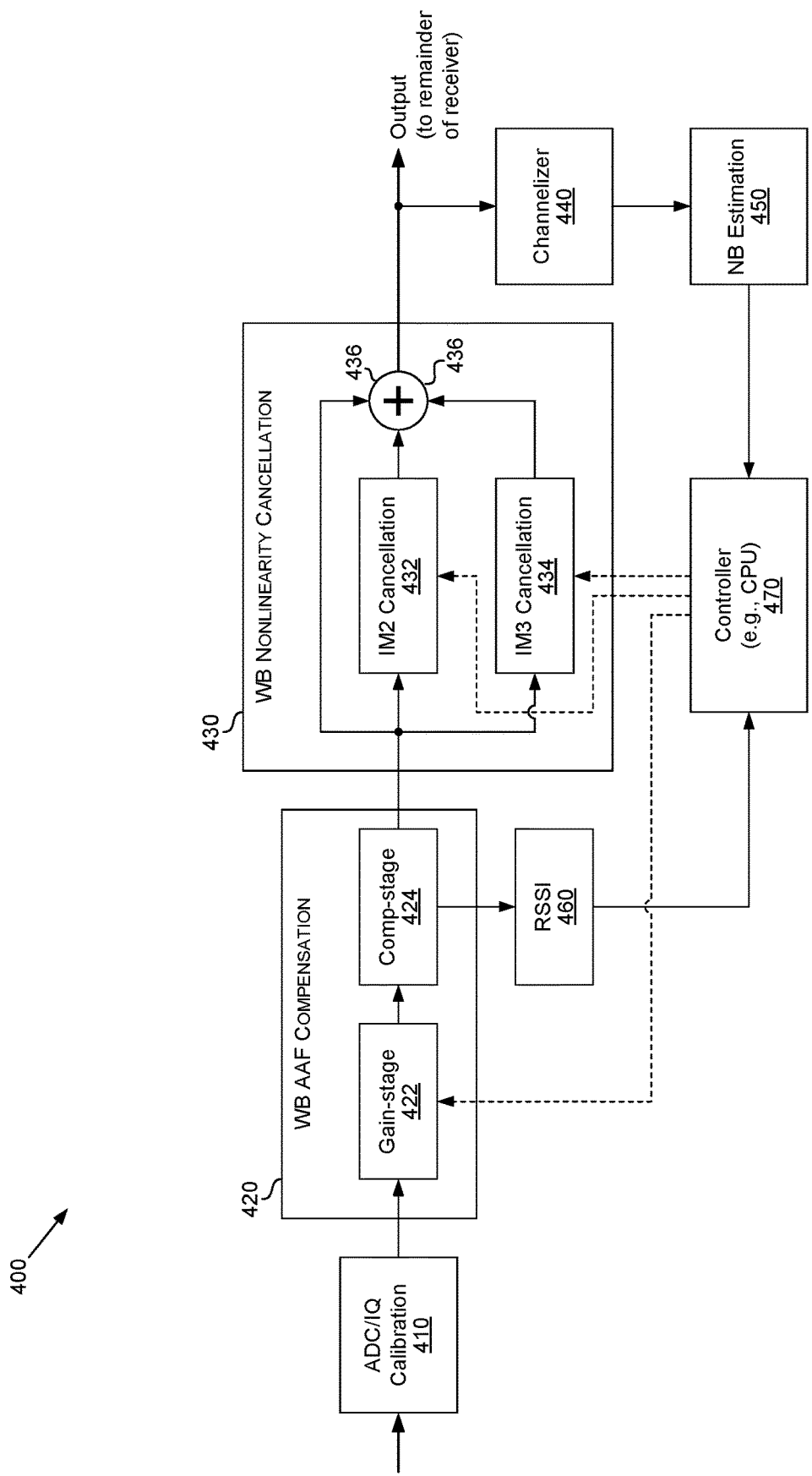
FIG. 4 illustrates example architecture for nonlinearity correction in receiver analog front-ends, using narrowband (NB) nonlinearity estimation and wideband (WB) nonlinearity correction.

FIG. 4 illustrates example architecture for nonlinearity correction in receiver analog front-ends, using narrowband (NB) nonlinearity estimation and wideband (WB) nonlinearity correction. Shown in FIG. 4 is processing block 400.

The processing block 400 may comprise suitable circuitry for performing nonlinearity estimation and correction during reception operations. In particular, the processing block 400 may be configured to perform narrowband (NB) estimation and wideband (WB) correction of nonlinearities during reception operations. The processing block 400 may be incorporated into a communication system to provide nonlinearity corrections. For example, with reference to the front-end AFE block 200 of FIG. 2, the processing block 400 may be implemented or added following conversion component 230, thus receiving as input the ADC signal(s) outputted by the ADC circuit(s) $232_i$. The processing block 400 (or components thereof) may be implemented as a new dedicated element—e.g., new dedicated circuitry added to the communication system. Alternatively, the processing block 400, or at least some components (e.g., circuits) thereof, may correspond to existing component(s) in the host communication system, which may simply be configured to perform the functions associated with the processing block 400 as described in this disclosure.

The processing block 400 may comprise an ADC/IQ calibration circuit 410, a wideband (WB) anti-aliasing filtering (AAF) compensation circuit 420, a wideband (WB) nonlinearity cancellation circuit 430, a channelizer circuit 440, a narrowband (NB) estimation circuit 450, a received signal strength indicator (RSSI) circuit 460, and a controller circuit 470.

The ADC/IQ calibration circuit 410 may be operable to calibrate input ADC signal(s), and/or input I/O components (e.g., corresponding to the ADC signal(s)).

The WB AAF compensation circuit 420 may be operable to perform anti-aliasing filtering compensation to an input signal (corresponding to the received signal). In this regard, the anti-aliasing filtering performed in the receiver (e.g., via the filter circuits $224_1$ and $224_2$ of the AFE block 200 FIG. 2, when implemented as anti-aliasing filter (AAF) circuits) may also include blocker filtering. Thus, the blockers may have to be reconstructed in the digital domain, which is done by the WB AAF compensation circuit 420, in order to cancel the nonlinearity effects added in the AFE before the AAF filter. The signal(s) handled in the WB AAF compensation circuit 420 is a (or are) wideband signal(s). The WB AAF compensation circuit 420 may comprise, for example, a gain-stage circuit 422, which may be operable to apply a particular gain (e.g., set or provided by the controller circuit 470), and a compensation-stage circuit 424, which may be operable to apply a particular compensation associated with anti-aliasing filtering—e.g., performed in the processing path, prior to the processing block 400.

The WB nonlinearity cancellation circuit 430 may be operable to perform wideband nonlinearity cancellation on the input signal, after having applied anti-aliasing filtering compensation thereto via the WB AAF compensation circuit 420. The signal(s) processed in the WB nonlinearity cancellation circuit 430 is a (or are) wideband signal(s). The WB nonlinearity cancellation circuit 430 may be configured to correct only second-order intermodulation (IM2) and third-order intermodulation (IM3), but not for higher order (or other types of) nonlinearity. For example, as shown in FIG. 4 the WB nonlinearity cancellation circuit 430 may comprise an IM2 cancellation circuit 432, an IM3 cancellation circuit 434, and an adder circuit 436. Thus, the WB nonlinearity cancellation circuit 430 may only include IM2 and IM3 cancellation components. The disclosure is not so limited, however, and WB nonlinearity cancellation performed by circuit 430 may be implemented to apply to other types and/or higher orders of nonlinearity.

The IM2 cancellation circuit 432 is operable to apply IM2 cancellation, such as to the input signal. Similarly, the IM3 cancellation circuit 434 is operable to apply IM3 (e.g., including RF IM3 and BB IM3) cancellation, such as to the input signal. The IM2 cancellation circuit 432 and/or the IM3 cancellation circuit 434 may be operable to apply the respective cancellation performed thereby based on control signals (e.g., comprising control parameters) from the controller circuit 470. Outputs of the IM2 cancellation circuit 432 and the IM3 cancellation circuit 434, as well as a copy of the signal inputted into the WB nonlinearity cancellation circuit 430 (from the WB AAF compensation circuit 420) are then combined via the adder 436.

The channelizer circuit 440 may be operable to channelize the input signal, after having applied anti-aliasing filtering compensation and wideband nonlinearity cancellation thereto, via the WB AAF compensation circuit 420 and the WB nonlinearity cancellation circuit 430, respectively. In this regard, the channelizer 440 may be operable to extract one or more narrowband (NB) channels from the original wideband signal.

The NB estimation circuit 450 may be operable to generate, such as based on channelization information obtained from the channelizer circuit 440, information relating to possible second-order and/or third-order products and their locations within the wideband signal being received and processed. That information may be provided to the controller circuit 470, which may use it—e.g., in determining and/or generating nonlinearity related control information.

The RSSI circuit 460 may be operable to generate, such as based on a signal received from the WB AAF compensation circuit 420 (output after compensation applied by the compensation-stage circuit 424), RSSI related information (and/or other types of power related measurement pertaining to the input signal). That information may be provided to the controller circuit 470, which may use it—e.g., in determining and/or generating control information used in the processing block 400. For example, the RSSI measurements provided by the RSSI circuit 460 may be used in controlling and/or configuring the AAF compensation applied by the of the AAF compensation circuit 420, such as by setting and/or adjusting the gain applied at the gain-stage circuit 422 and/or the compensation applied at the compensation-stage circuit 424. The RSSI measurements provided by the RSSI circuit 460 may also be used in controlling and/or configuring the nonlinearity correction (e.g., cancellation) based on target signal-to-noise ratio (SNR), which may be assessed or determined based on RSSI measurements, and/or in setting and/or adjusting the gain applied at the gain-stage circuit 422 in the AAF compensation circuit 420.

The controller circuit 470 may be operable to control overall operations of the processing block 400. For example, the controller circuit 470 may receive information from various components of the processing block 400, may process that information, and may generate control information (e.g., arrangement, configuration, and/or operational related data) for various components in the processing block 400. The controller circuit 470 may be, for example, a central processing unit (CPU) or other type of processor (general-purpose or special-purpose). With respect to nonlinearity correction operations, the controller circuit 470 may receive nonlinearity (or signal) related information (e.g., RSSI measurements from the RSSI circuit 460, 2nd/3rd order related product information from the NB estimation circuit 450, etc.), may process that information, and generate control information for various components in the processing block 400—e.g., the gain applied at the gain-stage circuit 422, the compensation applied at the compensation-stage circuit 424, the cancellation applied by the IM2 cancellation circuit 432 and/or the IM3 cancellation circuit 434, etc.

In operation, the processing block 400 may be operable to apply wideband (WB) correction and narrowband (NB) estimation to an input signal. The signal may be an intermediate signal in a reception processing path. For example, the input signal to the processing block 400 may be an ADC signal (e.g., output(s) of the ADC circuit(s) 234$_i$ of FIG. 2). The WB nonlinearity cancellation circuit 430 may be adaptively configured to implement a particular nonlinearity correction model. At least some of the parameters used in the correction model may be determined dynamically and continually (e.g., based on RSSI measurement, nonlinearity estimation, etc.), such as by the controller circuit 470, which may then provide them to the WB nonlinearity cancellation circuit 430.

In an example implementation, the nonlinearity correction model applied during WB cancellation (e.g., in the WB nonlinearity cancellation circuit 430) may be configured to correct only IM2 and IM3 (but not for higher order nonlinearity). Nonetheless, it should be understood that that the disclosure is not so limited, and that other (higher) order nonlinearities may also be handled (estimated and/or corrected) in a substantially similar manner (with the particular model being used being adjusted accordingly). Thus, the WB nonlinearity cancellation circuit 430 may only include IM2 and IM3 cancellation components (the IM2 cancellation circuit 432 and the IM3 cancellation circuit 434). An example correction model is now described. The incoming signal may be expressed as:

$$S(t)=S_I(t)+j\ S_Q(t) \quad (1)$$

The radio frequency (RF) IM3 corrections may be performed as follows:

$$\text{coef\_rf\_im3} \times S(t) \times \|S(t)\|^2 \quad (2)$$

The baseband (BB) IM3 corrections may be performed (at I and Q paths, respectively) as:

$$\text{coef\_bb\_im3} \times S_I(t)^3 \quad (3)$$

$$\text{coef\_bb\_im3} \times S_I(t)^3 \quad (4)$$

The baseband (BB) IM2 corrections may be performed (to the real and imaginary paths, respectively) as:

$$\text{coef\_bb\_im2\_r} \times S_I(t)^2 \quad (5)$$

$$\text{coef\_bb\_im2\_i} \times S_Q(t)^2 \quad (6)$$

The controller circuit 470 may determine the different coefficients (coef_rf_im3, coef_bb_im3, coef_bb_im2_r, and coef_bb_im2_i) based on, for example, the feedback received from the NB estimation circuit 450 and/or the control input from the RSSI circuit 460.

Nonetheless, while the processing block 400 is shown as only providing IM2/IM3 detection and cancellation, in some implementations, the processing block 400 may be configured to also detect and correct other types of nonlinearity products—e.g., 2nd order and/or 3rd order harmonic distortion (HD2/HD3), particularly where doing so may not require too much additional processing. For example, the processing block 400 may be operable to perform HD2/HD3 aliasing check (and correction based thereon). In this regard, it may be determined whether the HD2/HD3 of the blocker(s) (e.g., from the cancellation circuit) may fall on particular locations, such as IF±Fs (Fs=sampling frequency), and cause aliasing. In instances where the frequency of such blocker is less than (or equal) desired frequency, there may be no impact (thus no action may be needed). Where the blocker frequency is greater than the desired frequency, however, HD2 correction and HD3 correction may be removed. Further, in some instances, while removing HD3 correction, it may be added back to the crossmodulation (XMOD) correction term.

Figure 5:
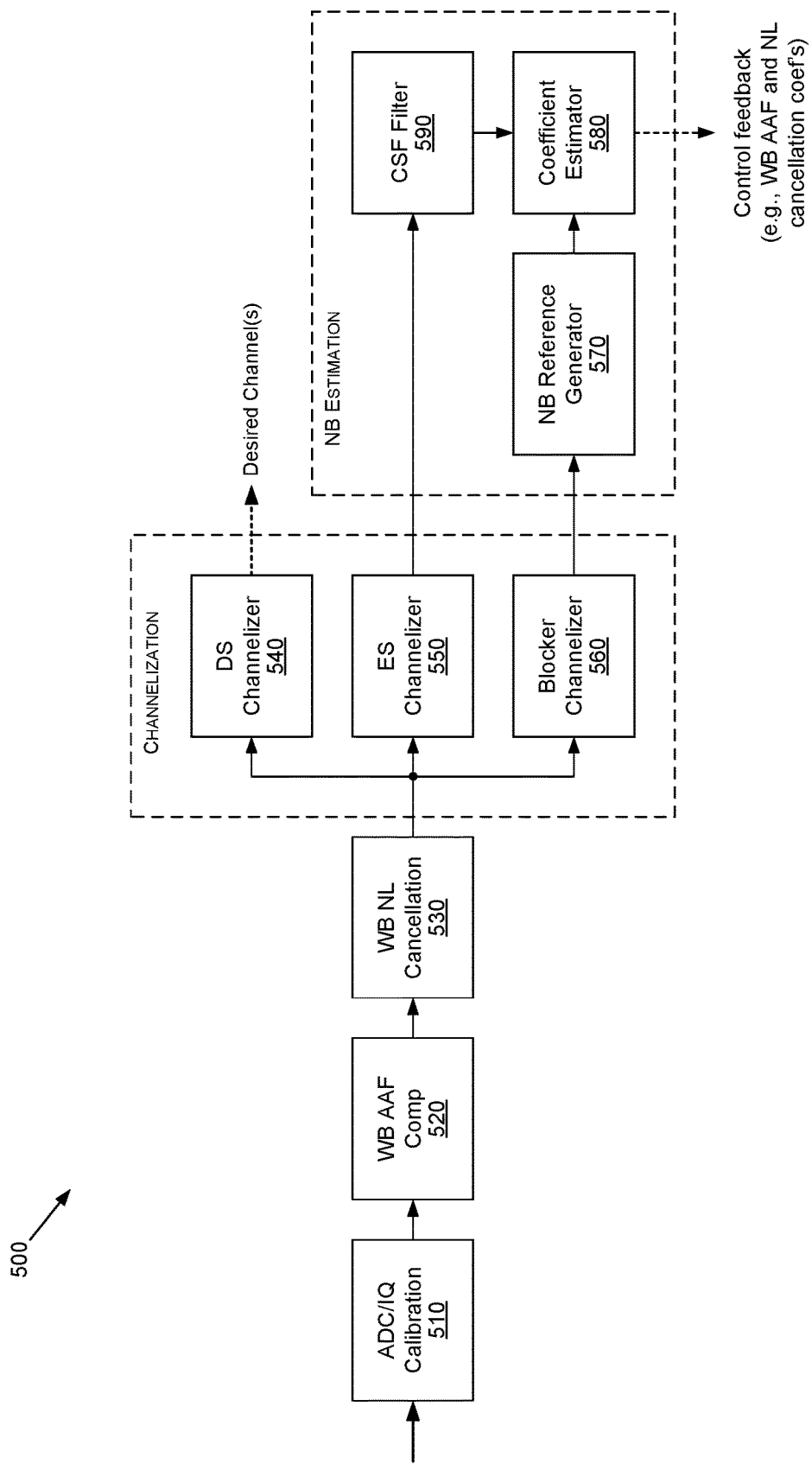
FIG. 5 illustrates example architecture for narrowband (NB) nonlinearity estimation and wideband (WB) nonlinearity correction.

FIG. 5 illustrates example architecture for narrowband (NB) nonlinearity estimation and wideband (WB) nonlinearity correction. Shown in FIG. 5 is processing block 500.

The processing block 500 may be similar to the processing block 400 of FIG. 4, for example. In this regard, the processing block 500 may comprise suitable circuitry for performing nonlinearity estimation and correction during reception operations. In particular, the processing block 500 may be operable to perform wideband (WB) nonlinearity cancellation and narrowband (NB) nonlinearity estimation. In the example implementation, the processing block 500 (or portion thereof) as shown in FIG. 5 may comprise an ADC/IQ calibration circuit 510, a wideband (WB) anti-aliasing filter (AAF) compensation circuit 520, a wideband (WB) nonlinearity cancellation circuit 530, a desired signal (DS) channelizer circuit 540, an estimated signal (ES) channelizer circuit 550, a blocker channelizer circuit 560, a narrowband (NB) reference generator circuit 570, a coefficient estimation circuit 580, and a (CFS) filter circuit 590.

Each of the ADC/IQ calibration circuit 510, the AAF compensation circuit 520, and the WB nonlinearity cancellation circuit 530 may be similar to, and may operate in substantially similar manner as the corresponding (and similarly named) element in the processing block 400 of FIG. 4—that is, the ADC/IQ calibration circuit 410, the WB AAF compensation circuit 420, and the WB nonlinearity cancellation circuit 430. Further, as noted with respect to the WB nonlinearity cancellation circuit 430 in particular (and the processing block 400 as a whole), while the processing block 500 and the nonlinearity estimation and correction related components and/or functions thereof may be described as being directed to correctly only second- and third-order nonlinearities (e.g., IM2 and IM3) but not for higher order nonlinearity), this is only an example implementation. Thus, in other implementations other (e.g., higher) order nonlinearities may also be handled (estimated and/or corrected) in substantially similar manner (with the pertinent components and/or functions being adjusted accordingly).

The DS channelizer circuit 540, the ES channelizer circuit 550, and the blocker channelizer circuit 560 may (individually and/or collectively) be operable to provide channelization function substantially in similar manner as the channelizer circuit 440 does in the processing block 400 of FIG. 4. In this regard, each of the DS channelizer circuit 540, the ES channelizer circuit 550, and the blocker channelizer circuit 560 may be operable to channelize an input signal, and/or to generate channelization information related thereto. For example, as shown in FIG. 5, each of these elements may receive a copy of the same input signal, which may correspond to the output of the WB cancellation circuit 530, and may apply channelization function thereto. Each of the DS channelizer circuit 540, the ES channelizer circuit 550, and the blocker channelizer circuit 560, however, may be configured to perform the channelization function based on different criteria. For example, the DS channelizer circuit 540 may be configured to extract and/or generate "desired" signal channels, and/or to generate channelization information relating thereto. The ES channelizer circuit 550 may be configured to extract and/or generate estimation signal channels, and/or to generate channelization information relating thereto. The blocker channelizer circuit 560 may be configured to extract and/or generate channelization information relating to blockers.

The NB reference generator circuit 570 may be operable to generate reference nonlinearity information relating to and/or associated with the blockers.

The coefficient estimation circuit 580 may be operable to generate control (estimation-related) feedback, which may be used (e.g., via a controller, such as control circuit 470 of FIG. 4) to generate information relating to control of nonlinearity cancellation. The information may comprise, for example, coefficients applied or used during wideband anti-aliasing filtering compensation (e.g., within the WB AAF compensation circuit 520) and/or wideband cancellation (e.g., within the WB cancellation circuit 530).

The CFS filter circuit 590 may be operable to extract a narrow band portion of a signal that can be used for the purpose of estimation of the nonlinearity capture in the frequency band.

Figure 6:
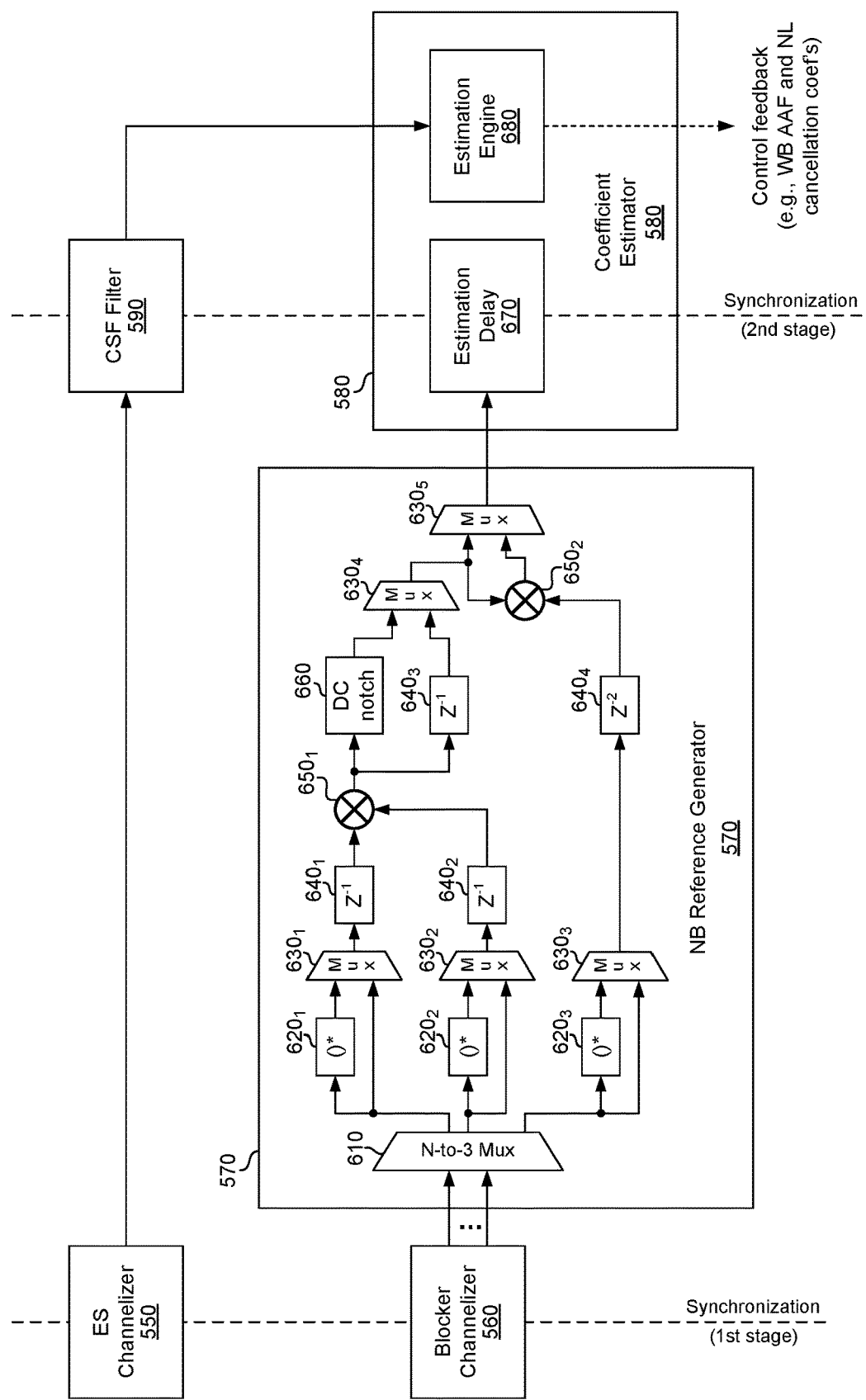
FIG. 6 illustrates example narrowband (NB) reference generator and coefficient estimator used for narrowband (NB) nonlinearity estimation.

FIG. 6 illustrates an example narrowband (NB) reference generator and coefficient estimator used for narrowband (NB) nonlinearity estimation. Shown in FIG. 6 is a portion of the processing block 500 of FIG. 5, particularly the ES channelizer circuit 550, the blocker channelizer circuit 560, the NB reference generator circuit 570, the coefficient estimation circuit 580, and the CFS filter circuit 590.

In this regard, illustrated in FIG. 6 are example implementations of NB reference generator circuit 570 and the coefficient estimation circuit 580, for providing second-order and third-order nonlinearity estimation and corrections (in the processing block 500). Nonetheless, it should be understood that while this specific implementation estimates and corrects only for second- and third-order nonlinearities, systems and methods implemented in accordance with the present disclosure may be extended to and/or applied in substantially similar manner in estimation and cancellation of other (higher) order nonlinearities.

As shown in FIG. 6, the NB reference generator circuit 570 may comprise an N-to-3 multiplexer (Mux) 610, plurality of conjugate function blocks $620_1$-$620_3$, a plurality of 2-to-1 multiplexers (Mux) $630_1$-$630_3$, a plurality of delay blocks $640_1$-$640_4$, a plurality of multipliers $650_1$-$650_2$, and DC notch block 660. These elements may be arranged within the NB reference generator circuit 570, for example, in the manner illustrated in the example implementation depicts in FIG. 6. The coefficient estimation circuit 580 may comprise an estimation delay block 670 and an estimation engine block 680. These elements may be arranged within the coefficient estimation circuit 580, for example, in the manner illustrated in the example implementation depicts in FIG. 6.

Each of the plurality of delay blocks $640_1$-$640_4$ may be configured to apply particular delays that may be needed to account for and/or accommodate processing or functions performed in NB reference generator circuit 570. For example, the delay blocks $640_1$-$640_3$ may apply one clock cycle delay whereas the delay block $640_4$ may introduce two clock cycles delay. The DC notch block 660 may be configured to remove (e.g., filter out) DC component(s). In this regard, the DC notch block 660 may be implemented as a filter circuit.

The estimation delay block 670 may be configured to apply a particular delay. In this regard, the delay applied by the estimation delay block 670 may be set or adjusted adaptively and/or dynamically. The estimation delay block 670 may introduce delay in the estimation path to account for processing in other paths—e.g., with respect to the desired signal channelization and/or the estimation signal channelization. Accordingly, the delay introduced by the estimation delay block 670 may ensure that the estimation function may be lines up with the desired signal (channels).

The estimation engine block 680 may be configured to generate estimation related data, such as nonlinearity estimation-based coefficients (or data that may be used in generating such coefficients such as by a separate controller element—e.g., the controller circuit 470 of FIG. 4). The estimation function performed via the estimation engine block 680 (e.g., to estimate required coefficients for correction/cancellation operations), may be implemented, for example, as least-mean-square (LMS) based function, blind-source separation (BSS) based function, etc.

In an example implementation, various measures may be taken during the channelization and/or estimation operations, to ensure that these operations, and subsequent operations performed based thereon (e.g., nonlinearity correction) are lined up correctly with the actual (e.g., desired) signals being handled. For example, two stages of synchronization may be performed, including a first-stage synchronization that is performed by the channelizer elements (e.g., ES channelizer circuit 550 and the blocker channelizer circuit 560), and second-stage synchronization which may be applied during estimation step (e.g., with the delay applied by the estimation delay block 670 being used to ensure that).

Figure 7:
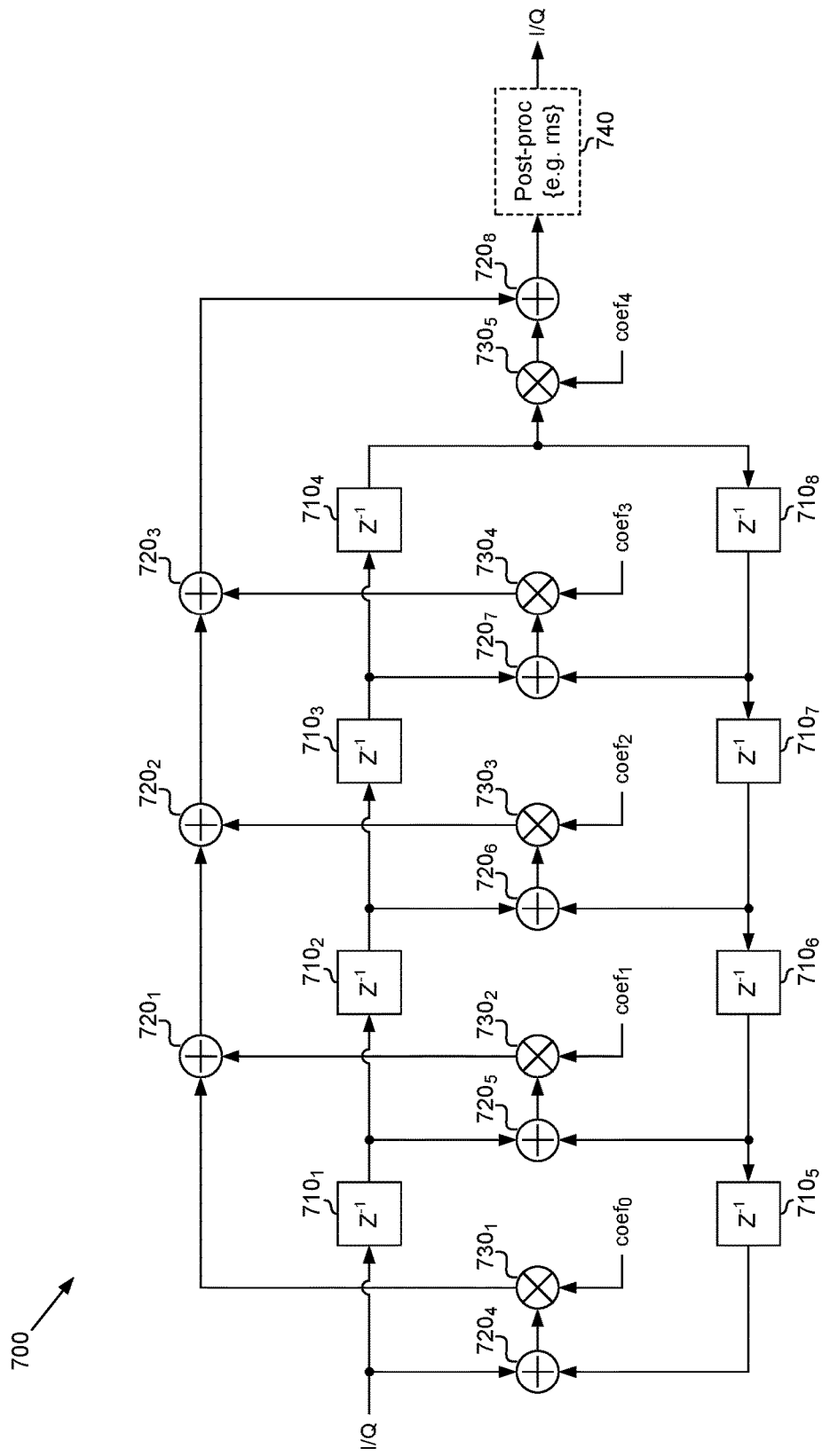
FIG. 7 illustrates example anti-aliasing filtering (AAF) compensation circuit for use in nonlinearity correction in receiver analog front-ends.

FIG. 7 illustrates example anti-aliasing filtering (AAF) compensation circuit for use in nonlinearity correction in receiver analog front-ends. Shown in FIG. 7 is an anti-aliasing filtering (AAF) compensation circuit 700.

The AAF compensation circuit 700 may be operable to apply compensation associated with anti-aliasing filtering. For example, the AAF compensation circuit 700 may be to support wideband (WB) anti-aliasing filtering compensation. In this regard, the AAF compensation circuit 700 may represent an example implementation of the WB AAF compensation circuit 420 of FIG. 4 (or the WB AAF compensation circuit 520 of FIG. 5).

As shown in FIG. 7, the AAF compensation circuit 700 may comprise a plurality of delay blocks $710_1$-$710_4$, a plurality of adders $720_1$-$720_8$, a plurality of multipliers $730_1$-$730_5$, and a post-processing (applying post-processing functions, such as round-and-saturation (rns) function) block 740. These elements may be arranged, for example, in the manner illustrated in the example implementation depicted in FIG. 7.

Each of the plurality of delay blocks $710_1$-$710_4$ may be configured to apply particular delays that may be needed to account for and/or accommodate processing or functions performed in the AAF compensation circuit 700. For example, each of the delay blocks $710_1$-$710_4$ may apply one clock cycle delay.

The compensation performed by the AAF compensation circuit 700 may be adjusted, adaptively, by adjusting a plurality of compensation coefficients (coef0-coef4) which may be applied in the AAF compensation circuit 700—being input into the multipliers $720_1$-$720_5$, as shown in FIG. 7.

The compensation coefficients coef0-coef4 may be set and/or adjusted by a controller element (e.g., the controller circuit 470 in FIG. 4), which may calculate and/or determine these compensation coefficients, such as based on preset data and/or dynamically obtained control data. For example, the compensation coefficients coef0-coef4 may be determined or adjusted, at least in part, based on signal related measurements (e.g., RSSI measurements, such as those provided by the RSSI circuit 460 in FIG. 4).

Figure 8:
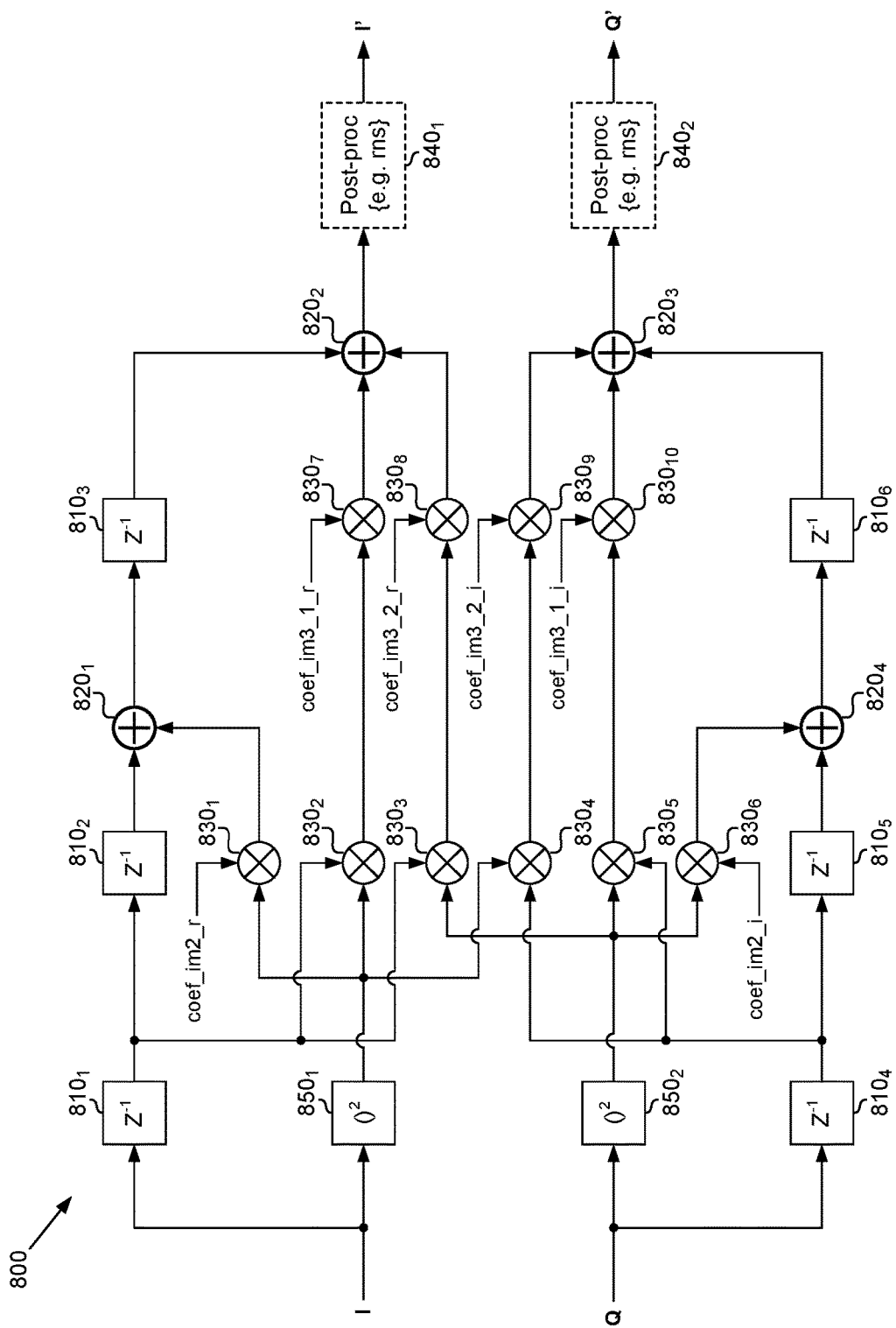
FIG. 8 illustrates example nonlinearity cancellation circuit for use in nonlinearity correction in receiver analog front-ends.

FIG. 8 illustrates example nonlinearity cancellation circuit for use in nonlinearity correction in receiver analog front-ends. Shown in FIG. 8 is a nonlinearity (NL) cancellation circuit 800.

The NL cancellation circuit 800 may be operable to apply compensation associated with anti-aliasing filtering. For example, the NL cancellation circuit 800 may be operable to support wideband (WB) nonlinearity cancellation. In this regard, the NL cancellation circuit 800 may represent an example implementation of the WB cancellation circuit 430 of FIG. 4 (or the WB cancellation circuit 530 of FIG. 5).

As shown in FIG. 8, the NL cancellation circuit 800 may comprise a plurality of delay blocks $810_1$-$810_6$, a plurality of adders $820_1$-$820_4$, a plurality of multipliers $830_1$-$830_{10}$, a plurality of post-processing (e.g., round-and-saturation (rns) function) blocks $840_1$-$840_2$, and plurality of square function blocks $850_1$-$850_2$. These elements can be arranged in the manner illustrated in the example implementation depicts in FIG. 8.

Each of the plurality of delay blocks $810_1$-$810_6$ may be configured to apply particular delays that may be needed to account for and/or accommodate processing or functions performed in the NL cancellation circuit 800. For example, each of the delay blocks $810_1$-$810_6$ may apply one clock cycle delay.

The nonlinearity cancellation performed by the NL cancellation circuit 800 may be adjusted, adaptively, by adjusting a plurality of NL cancellation coefficients (e.g., which may be applied in the AAF NL cancellation circuit 800— being input into some of the multipliers $830_1$-$830_{10}$, as shown in FIG. 8.

The NL cancellation coefficients may be set and/or adjusted by a controller element (e.g., the controller circuit 470 in FIG. 4), which may calculate and/or determine these NL cancellation coefficients, such as based on preset data and/or dynamically obtained control data. For example, the NL cancellation coefficients may be determined or adjusted, at least in part, based on nonlinearity estimation (e.g., narrowband (NB) estimation, such as those provided by the NL estimator circuit 450 in FIG. 4; or by coefficient estimator circuit 580 in FIG. 5).

In the example implementation shown in FIG. 8, NL cancellation coefficients may be configured for use in cancelling 2nd order and 3rd order intermodulation (IM2 and IM3). In this regard, the NL cancellation coefficients may be set based on the correction model implemented in the system. For example, the NL cancellation coefficients as shown in FIG. 8 may be determined, based on the coefficients associated with the correction model described with respect to FIG. 4, as follows:

$$coef\_im3\_1\_r = coef\_rf\_im3 + coef\_bb\_im3 \quad (7)$$

$$coef\_im3\_1\_i = coef\_rf\_im3 + coef\_bb\_im3 \quad (8)$$

$$coef\_im3\_2\_r = coef\_rf\_im3 \quad (9)$$

$$coef\_im3\_2\_i = coef\_rf\_im3 \quad (10)$$

$$coef\_im2\_r = coef\_bb\_im2\_r \quad (11)$$

$$coef\_im2\_i = coef\_bb\_im2\_r \quad (12)$$

Figure 9:
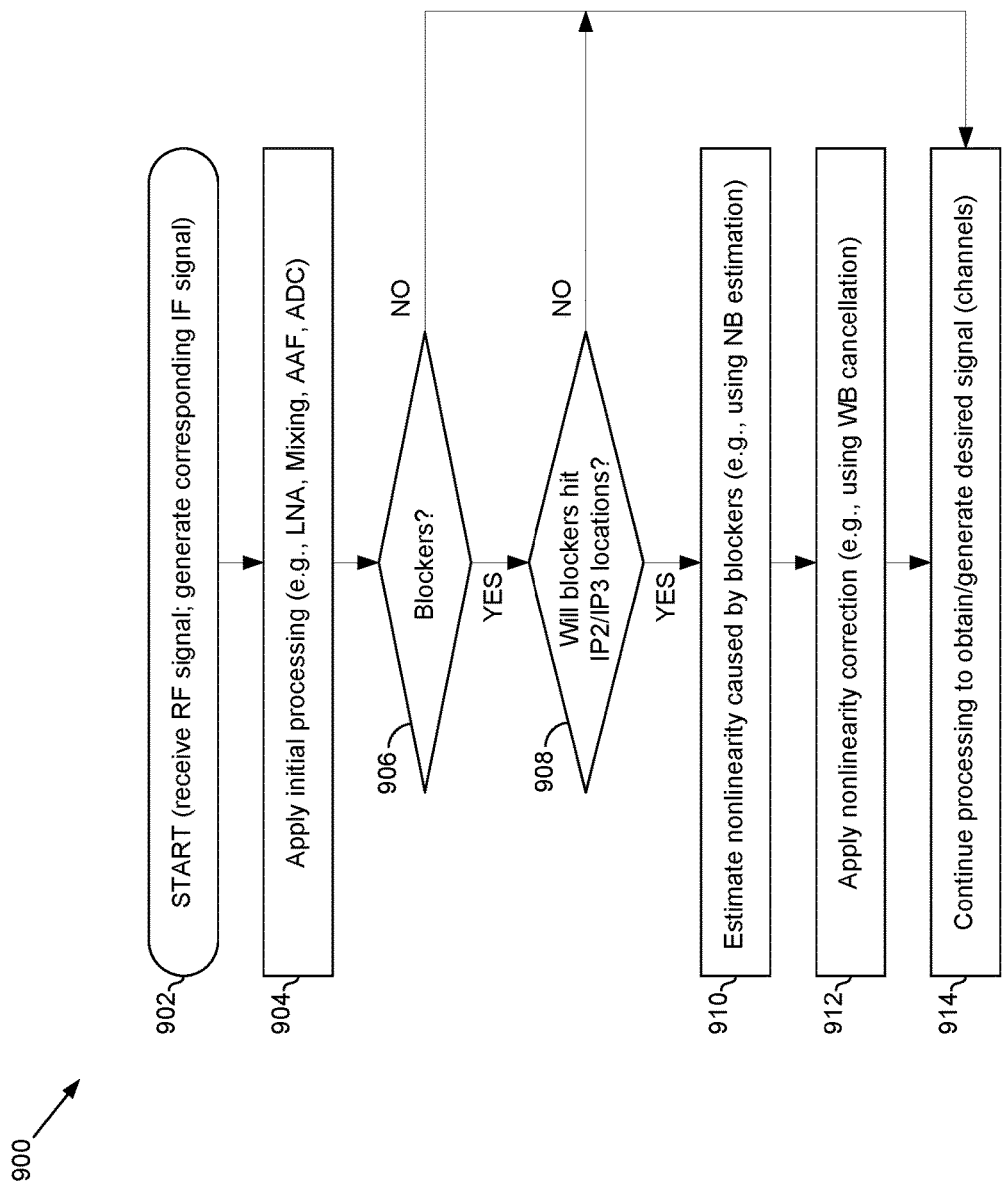
FIG. 9 illustrates a flowchart of an example process for nonlinearity detection and correction during communications.

FIG. 9 illustrates a flowchart of an example process for nonlinearity detection and correction during communications. Shown in FIG. 9 is flow chart 900, comprising a plurality of example steps (represented as blocks 902-914).

In start step 902, a signal (e.g., RF signal) may be received (e.g., via a RF transceiver), and a corresponding IF signal may be generated.

In step 904, initial processing (e.g., LNA, Mixing, AAF, ADC) may be applied to the received signal.

In step 906, it may be determined whether there any blockers (and/or Tx leakage). If so, the process may proceed to step 908; otherwise the process may jump to step 914.

In step 908, it may be determined whether any of the blockers may hit the 2nd order and/or 3rd order (IP2/IP3) locations. If so, the process may proceed to step 910; otherwise the process may jump to step 914.

In step 910, nonlinearity caused by blockers may be estimated (e.g., using narrowband (NB) estimation, as described with above.

In step 912, nonlinearity correction may be applied (e.g., using wideband (NB) cancellation, as described with above.

In step 914, the processing of the input signal may continue, to obtain/generate desired signal (channels).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for performing narrowband (NB) estimation, the method comprising:
    generating estimation channelization information relating to received RF signals;
    generating reference nonlinearity information relating to one or more other signals, wherein the one or more other signals cause or contribute to nonlinearity that affects processing of the received RF signals; and
    generating, based on the estimation channelization information relating to the received RF signals and the reference nonlinearity information relating to the one or more other signals, control data for configuring nonlinearity cancellation functions.

2. The method of claim 1, comprising:
    channelizing the received RF signals; and
    generating the estimation channelization information based on the channelization of the received RF signals.

3. The method of claim 2, comprising:
    extracting during the channelization of the received RF signals, one or more narrowband (NB) channels; and
    generating the estimation channelization information based on the extracted one or more narrowband (NB) channels.

4. The method of claim 1, comprising:
    channelizing the one or more other signals; and
    generating the reference nonlinearity information based on the channelization of the one or more other signals.

5. The method of claim 4, comprising:
    obtaining a plurality of channels based on the channelization of the one or more other signals; and
    generating the reference nonlinearity information based on processing of the plurality of channels.

6. The method of claim 5, comprising selecting a subset of channels, and processing only each of the subset of channels.

7. The method of claim 6, comprising applying a conjugate function based adjustment to one or more of the subset of channels.

8. The method of claim 6, comprising applying a DC notch based adjustment to at least one or the subset of channels, the DC notch based adjustment comprising removing DC components.

9. The method of claim 6, comprising applying one or more delays to synchronize processing of each of the subset of channels.

10. The method of claim 1, comprising applying a delay to synchronize the generating of the estimation channelization information relating to the received RF signals and the generating of the reference nonlinearity information relating to the one or more other signals.

11. A system comprising:
    one or more circuits for performing narrowband (NB) estimation, the one or more circuits being configured to:
        generate estimation channelization information relating to received RF signals;
        generate reference nonlinearity information relating to one or more other signals, wherein the one or more other signals cause or contribute to nonlinearity that affects processing of the received RF signals; and
        generate, based on the estimation channelization information relating to the received RF signals and the reference nonlinearity information relating to the one or more other signals, control data for configuring nonlinearity cancellation functions.

12. The system of claim 11, wherein the one or more circuits are configured to:
    channelize the received RF signals; and
    generate the estimation channelization information based on the channelization of the received RF signals.

13. The system of claim 12, wherein the one or more circuits are configured to:
    extract during the channelization of the received RF signals, one or more narrowband (NB) channels; and
    generate the estimation channelization information based on the extracted one or more narrowband (NB) channels.

14. The system of claim 11, wherein the one or more circuits are configured to:
    channelize the one or more other signals; and
    generate the reference nonlinearity information based on the channelization of the one or more other signals.

15. The system of claim 14, wherein the one or more circuits are configured to:
    obtain a plurality of channels based on the channelization of the one or more other signals; and
    generate the reference nonlinearity information based on processing of the plurality of channels.

16. The system of claim 15, wherein the one or more circuits are configured to select a subset of channels, and processing only each of the subset of channels.

17. The system of claim 16, wherein the one or more circuits are configured to apply a conjugate function based adjustment to one or more of the subset of channels.

18. The system of claim 16, wherein the one or more circuits are configured to apply a DC notch based adjustment to at least one or the subset of channels, the DC notch based adjustment comprising removing DC components.

19. The system of claim 16, wherein the one or more circuits are configured to apply one or more delays to synchronize processing of each of the subset of channels.

20. The system of claim 11, wherein the one or more circuits are configured to apply a delay to synchronize the generating of the estimation channelization information relating to the received RF signals and the generating of the reference nonlinearity information relating to the one or more other signals.

* * * * *